United States Patent [19]
Jeney et al.

[11] Patent Number: 5,464,454
[45] Date of Patent: Nov. 7, 1995

[54] APPARATUS AND METHODS FOR THE UTILIZATION OF COMBUSTIBLE MATERIALS ESPECIALLY OF INDUSTRIAL AND HOUSEHOLD WASTE

[76] Inventors: Peter Jeney, Artherstrasse 24, CH-63000 Zug; Ernst Christen, Rosenweg 623, CH-5726 Unterkulm, both of Switzerland

[21] Appl. No.: 172,872

[22] Filed: Dec. 23, 1993

[30] Foreign Application Priority Data

Dec. 24, 1992 [EP] European Pat. Off. .............. 92122005
Dec. 15, 1993 [EP] European Pat. Off. .............. 93120170

[51] Int. Cl.$^6$ ..................................................... F23G 7/00
[52] U.S. Cl. .................. 44/629; 44/634; 44/593; 110/229
[58] Field of Search .............................. 44/629, 641, 634, 44/593; 110/229

[56] References Cited

U.S. PATENT DOCUMENTS

| | | | |
|---|---|---|---|
| 2,014,686 | 9/1935 | Lubovitch et al. ................ | 44/603 |
| 4,568,360 | 2/1986 | Brisset et al. . | |
| 4,822,379 | 4/1989 | Thompson ........................... | 44/589 |
| 4,985,049 | 1/1991 | Kim ..................................... | 44/629 |
| 5,009,672 | 4/1991 | Ruffo et al. ........................ | 44/593 |
| 5,221,290 | 6/1993 | Dell .................................... | 44/593 |
| 5,281,243 | 1/1994 | Leininger .......................... | 44/629 |

FOREIGN PATENT DOCUMENTS

| | | |
|---|---|---|
| 0112219 | 11/1983 | European Pat. Off. . |
| 0249131 | 6/1987 | European Pat. Off. . |
| 786408 | 10/1935 | France . |
| 886073 | 10/1943 | France . |
| 2436267 | 12/1976 | Germany . |
| 50-023408 | 3/1975 | Japan . |
| 4013798 | 1/1992 | Japan . |
| 347575 | 4/1931 | United Kingdom . |
| 2155161 | 9/1985 | United Kingdom . |
| 9309207 | 5/1993 | WIPO . |

*Primary Examiner*—Prince Willis, Jr.
*Assistant Examiner*—J. Silbermann
*Attorney, Agent, or Firm*—Welsh & Katz, Ltd

[57] ABSTRACT

The present invention concerns gasification, respectively an incineration reactor in which a gas is produced which is used for the environmentally friendly production of energy with virtually no emissions. Furthermore, a process for the production of energy briquettes from burnable industrial or household waste in the form of briquettes with a defined, high calorific value.

6 Claims, 2 Drawing Sheets

APPARATUS AND METHODS FOR THE UTILIZATION OF COMBUSTIBLE MATERIALS ESPECIALLY OF INDUSTRIAL AND HOUSEHOLD WASTE

This invention relates to an apparatus for the utilization of combustible materials, especially an apparatus for the disposal of toxic industrial and household waste, in conjunction with the recovery of energy, as well as a method to convert such waste materials to a form which can be handled by the apparatus, especially to the form of briquette with a defined calorific value.

BACKGROUND OF THE INVENTION

Various methods concerning the conversion of waste to energy through incineration are known. To operate such incinerators with industrial waste, especially liquid and toxic waste, is problematic as such waste products often contain halogenated hydrocarbons which lead to damage of the combustion chamber and the incinerator. Furthermore, the secure destruction of toxic waste requires a constant and even temperature in the burning process which is difficult to maintain, as the various wastes have different calorific values. This problem is generally resolved by using fuel to sustain the required temperatures. When toxic waste is incinerated, an additional problem arises when dioxins and dibenzofurans are created which again can only be destroyed efficiently if permanent temperatures of minimum 1260° C. can be maintained.

Furthermore, it is known that conventional incineration methods have the tendency to create a dense surface of the goods to be burned during incineration or gasification, resulting in excessive slag and unburned residues.

Another problem is the storage and transport of such toxic waste, especially toxic liquid waste, but also toxic solid waste, requiring expensive security measures. These are reasons why it gets more and more difficult to obtain permits for a site to handle toxic waste and to erect incinerators for toxic waste. More and more opposition against new and already existing incinerators is the result.

Furthermore, the transportation of toxic industrial waste, and other waste materials, is a generally known problem.

The aim of the present invention is to provide a solution to these problems by means of a gasification reactor permitting incineration with very few or no harmful emissions or residues, preferably at very high temperatures in conjunction with the production of energy, and by means of providing methods to produce a fuel with a defined calorific value from solid and liquid, at least partially combustible waste. The problem is solved by providing an apparatus in the form of a gasification reactor with a chamber in the form of a double dome, whereby the inner dome is turnable in relation to the fixed outer dome, especially in combination with a catalyst station providing a gas mixture to increase the gasification temperature.

The invention is hereunder described referring to the figures

Figure 1:
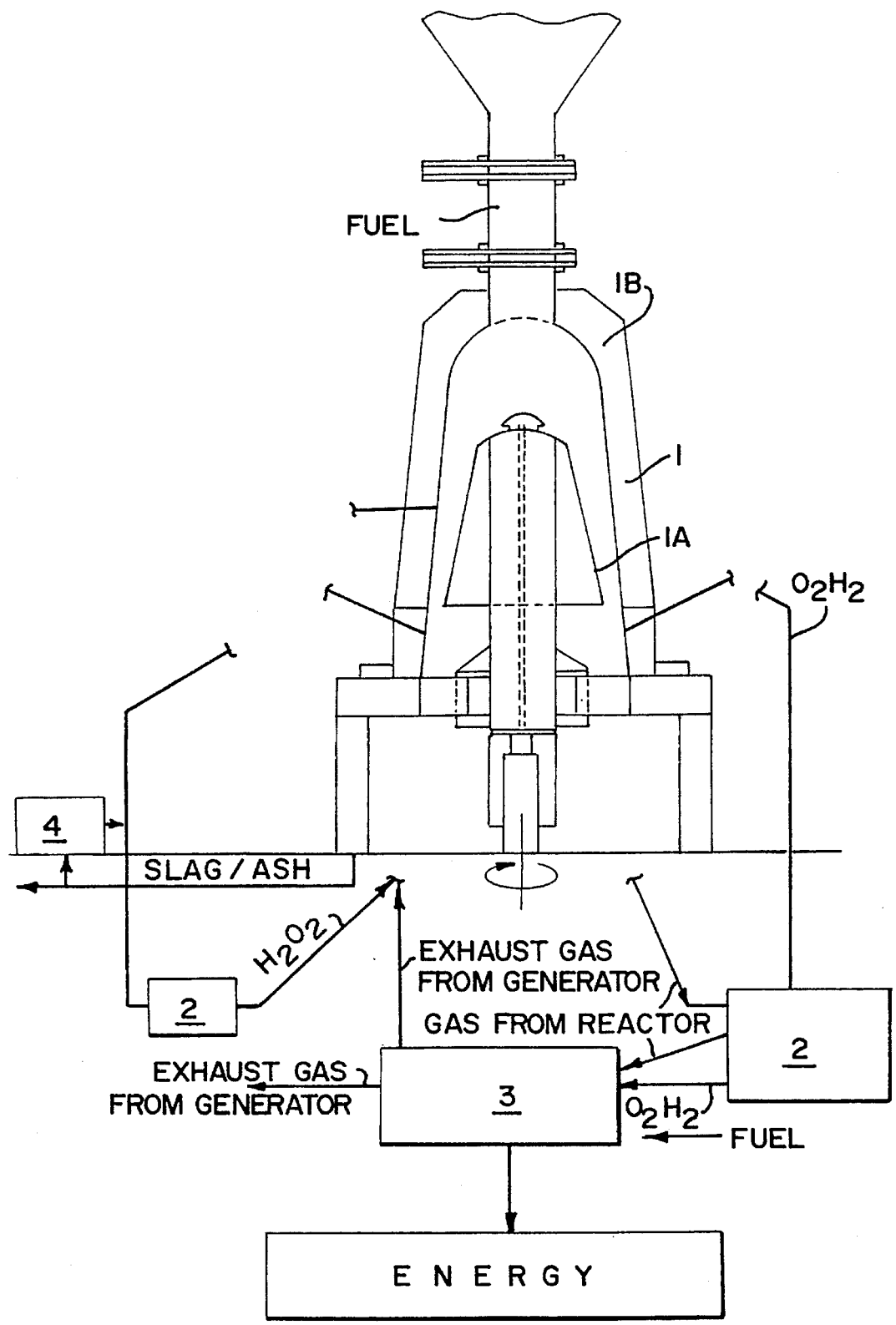
FIG. 1 shows a gasification reactor, respectively an incineration oven, with a closed circuit and the production of energy.
Figure 2:
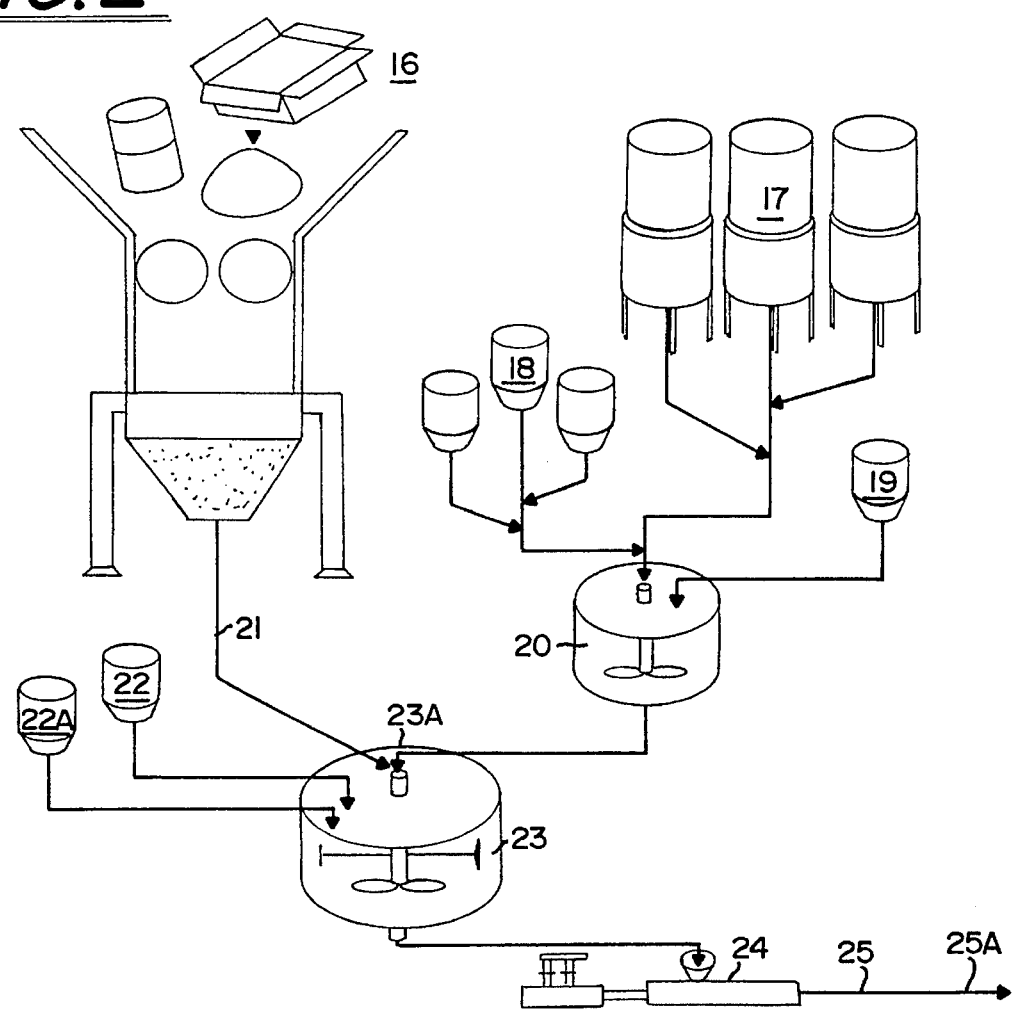
FIG. 2 shows in detail a catalyst station 2.

1 Gasification, respectively incineration reactor
1A Inner dome
1B Outer dome
2 Catalyst station
3 Energy generator
4 Apparatus for the manufacturing of energy briquettes, respectively energy storage
5 Liquid separator
6 Container for the production of hydrogen/oxygen (secured against explosion)
7 Recycling station for the precipitates
8 valve and dosing unit
9 Lanthanide solution
10 Precipitation
11 Heat exchanger
12 Heat source, e.g. gas from gasification reactor 1
13 Pipe for closed circuit and recycling of precipitates
14 Pump
15 Feeding of hydrogen/oxygen mixture to gasification reactor
16 Shredder for reducing the size of calorific solid waste
17 Storage tanks for calorific liquid waste
18 Addition of reagent chemicals
19 Addition of combustion enhancing additives
20 Mixing tank
21 Feeding of shredded solid waste
22 Addition of metals (Mn, Zn, Ni, Cu), respectively their salts and/or silicates
22A Addition of solidification reagents
23 Mixing and reaction tank
23A X-ray treatment
24 High pressure treatment
25 Feeding of the homogenous energy briquettes to the incineration, respectively gasification reactor, or
25A Feeding of the briquettes to the energy storage place The gasification chamber is situated between the walls of the two domes and must have minimum one infeed for the brickettes, one infeed for the gas mixture and minimum one outfeed for the gas mixture.

Domes 1A and 1B of the gasification reactor 1 are manufactured out of a high temperature resistant material. The requirements for this material are determined by the energy briquettes, respectively the high temperatures generated in the reactor. For the gasification or incineration of waste, especially of toxic industrial waste, with minimal or no emissions high temperatures are required, at least 1260° C., preferably minimum 1500° C. up to 2000° C. and more. To withstand these temperatures, the reactor domes are made out of high temperature resistant ceramic material.

The body of each of the domes is preferably a spherical segment, ending in a cone. In a prefered embodiment, the two domes are located concentrically to one another. The inner dome 1A is rotatable which leads to an even gasification without creation of excessive slag and the dome preferably is also adjustable in the vertical level in relation to the outer dome 1B. Through these adjustment possibilities the size of the gasification chamber between dome 1A and 1B can be changed and at the same time the burning speed, respectively transfer speed of the material to be burned, can be adjusted. For most applications the best distance between the two domes lies between 5 to 10 cm at the bottom.

The diameter of the inner dome is normally more than 1 m, usually approximately 1.5 m. With a reactor of these dimensions approximately 1 ton of brickettes or waste can be incinerated, respectively gasified.

The opening for feeding the briquettes or the waste to be incinerated or gasified is preferably on top of the dome. Furthermore, at least one gas infeed and one gas outfeed is required, the dome preferably features several such infeeds and outfeeds which are positioned at several levels of the outer dome and are equipped with appropriate controls. The infeed and outfeed of the gas takes place in the lower section of the reactor, the lower ⅔ in reference to its inner height.

It was found that the gasification, respectively incineration, temperature can be increased if not only air or oxygen are fed into the chamber, but a mixture of hydrogen/oxygen which greatly enhance the efficiency of the gasification, respectively incineration.

Such a hydrogen/oxygen gas mixture can be produced by various methods, for example through electrolysis. An especially cost and energy efficent method is the use of a catalyst on the basis of lanthanides in acid solution.

The production of such gas mixtures takes place in a catalyst station, preferably in a pressure vessel.

For the production of hydrogen/oxygen the lanthanides (majority La and Ce) being the combustion enhancing additive, are preferably contained in an acid solution in a pressure vessel in which the lanthanide combinations are contained in a dissolved form. This solution catalyzes the disassociation of water to hydrogen and oxygen. As soon as the pH-value is increased, the lanthanides begin to precipitate after which the reaction is terminated. The precipitate can be redissolved by adding acid either in the pressure vessel 6 or in another vessel 7, from where it can be brought back to the reaction again. The addition of small quantities of other catalytic metals, especially manganese, zinc, nickel and/or copper, usually 1–10% of the content of lanthanides, can also create a positive reaction.

It was found that the reaction is best at temperatures between 50°–60° C., whereby a gas mixture of hydrogen and oxygen is created in volume ratios of approximately 1:2 to 1:5, preferably 1:3.

Ideally, the hot gases from the gasification reactor are used to operate the catalyst station where the gases can heat the liquid catalyst through a heat exchanger which helps the desired reaction for the production of hydrogen and oxygen.

The gases from the reactor are preferably analysed between the catalyst station 2 and the generator 3 in order to be adjusted with $H_2$ and $O_2$ to obtain the desired gas mixture to operate the engine 3, which can for example drive an electric generator. The majority of the exhaust gases from the engine is again adjusted with $H_2O_2$ and is returned into the gasification reactor. Only a small part of these exhaust gases is released through an over-pressure valve to the atmosphere after having been cleaned by a catalyst.

The catalyst station preferably is also connected to the gasification reactor in a way that the addition of hydrogen/oxygen can be adjusted in an optimum way to obtain the high temperatures required in the gasification reactor.

Due to the mainly closed circuit and the high gasification temperatures and due to the adsorption process, very clean exhaust gases are produced.

The apparatus is equipped with appropriate analysis and monitoring equipment in various places, monitoring the composition of the gas and preventing excessive hydrogen concentrations in the system. For security reasons the hydrogen concentration never exceeds 4% by volume.

The apparatus, respectively the gasification reactor, can be operated in multiple executions which is advantageous for maintenance and increases the flexibility and security of the system.

As an example, the inventive apparatus can, by reusing 90% of the gases and operating at a temperature of 1500° C. with the addition of a gas mixture of hydrogen and oxygen, produce from 1 ton of waste minimum 1500 kWh electricity with a residue of not more than 2% slag and 1% ash.

For an optimum operation of the reactor an energy briquette with a continous and defined calorific value is desirable. Such a briquette can be manufactured by a method which is also part of this invention.

The raw materials for the production of such energy briquettes can be a wide variety of industrial, municipal or toxic waste from the chemical industry, pharmaceutical industry, refineries and residues from organic materials, but also waste paints, lacquers, glues, resins and a wide variety of plastics and/or textile wastes.

Figure 3:
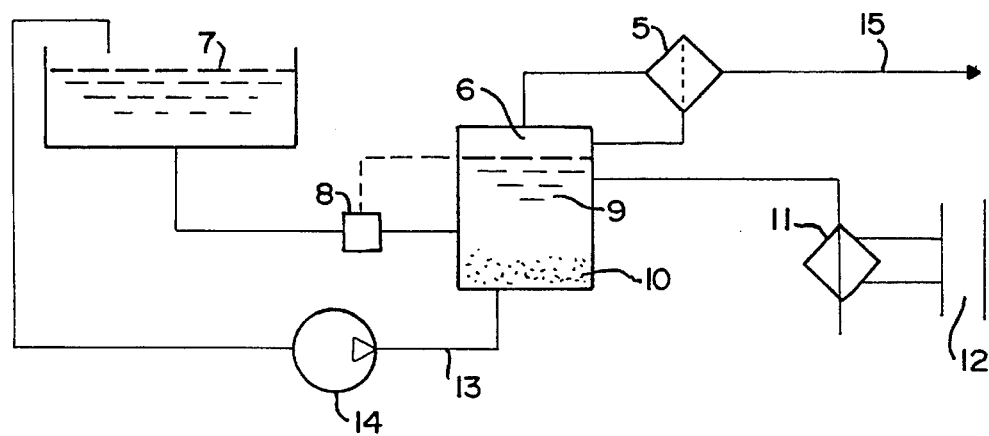
FIG. 3 shows in detail an apparatus 4 for the production of energy briquettes with a defined calorific value, to be produced especially from burnable industrial or household waste.

Such materials can be converted to proper energy briquettes according to the invention as follows:

The inventive procedure is described as per FIG. 3.

The waste products to be converted to briquettes are analysed and thereafter stored in individual bins or containers, The values of importance to the process are the pH-value, the calorific value and the contents of the hydrocarbons. In this first step the liquid and the solid waste are treated separately.

The solid waste 18 is in a first step shredded. The liquid waste 17 is neutralized and treated with several chemicals 18. Such chemicals are acids or bases which are combined to adjust the pH-value of the final product, or are used in the process as reduction agent or oxidisers. The creation of exothermic reactions is desired in this stage. After intensive mixing and homogenizing in the mixing tank 20, the so treated liquids are fed to the shredded solid waste in a special mixing and reaction tank 23.

At the same time solidification reagents 22A are added to the mixture 23. Thereafter the so obtained paste-like product is treated in a high pressure chamber, or with high pressure pumps, where at temperatures between 20°–120° C. and pressures between 2 to 4, often even up to 400 kg/cm², a solidification of the product is achieved, in order to obtain an environmentally stable product passing leaching tests as non-hazardous waste.

At the same time a dewatering is achieved. The small quantities of liquids released during the process can be returned within the closed circuit. The brickettes can be manufactured in a wide variety of forms to be fed to the gasification reactor or to storage.

As reagents 18 a wide variety of liquid waste in the form of acids or alkaline reagents can be used. For acid treatment any strong inorganic acid can be used, or any mixture thereof. As alkaline reagents the ones of choice are sodium hydride, calcium chloride, calcium sulphate and similar ones. As reduction and oxidation chemicals molecular halogens, molecular oxygen, ozone or mixtures of iron (II) and iron (III) salts are prefered, in quantities of 0,2–0,3 volume %.

As solidification reagents 22A a variety of monomers or possibly oligomers can be used, as well as soluble silicates which at the desired reaction conditions of normally 20°–120° C. temperatures and a pressure of 2–400 kg/cm², lead to a solidification of the waste without producing effects hindering the gasification or incineration process. Especially useful are acrylic monomers, especially acrylic esters, as well as certain polyacrylates, such as e.g. acrylon from BASF as well as the already mentioned soluble silicates. The addition of polyols and isocyanates can also be desirable to improve the storage qualities and the non-leachability of the briquettes and to increase the flash point.

Furthermore, it was found that the combination of solid and liquid waste in a proportion of 65–45% solid waste and 35–55% liquid is advantageous and can for example be solidified already with a very small quantity of acrylic esters of less than 3% of the total volume. If the volume of solid waste is decreased, the solidification component must be increased.

The plant is built in a way so that in the reaction tank dosing of the reaction agents can be adjusted at any time.

Furthermore, the process foresees the possibility of including additives 19 to adjust the desired calorific values of the briquettes. Such additives can be added at any point of the process, be it in the reaction tank or the mixers; however, in order to obtain a homogenous distribution such additives are preferably added in the mixing tank 20. Especially suitable additives to enhance the incineration and gasification properties of the briquettes are salts of lanthanides or the addition of monazit sands in which the lanthanides can be enriched to a level of 3 to 30%, or a mixture of pure lanthanide salts preferably in combination with one or more silicates, or any other lanthanide. The additives are usually used in a concentration of approximately 20%.

The addition of such additives enhancing the gasification properties permits the controlled increase of the temperature between 100°–500° C., by using the same quantity of briquettes, which still makes the use of an external catalyst station desirable, but not absolutely necessary.

The invented process is further permitting the addition of a station, prior to the reaction tank 23, producing gamma rays in order to destroy halogenated hydrocarbons or their by-products through gamma rays as for example $^{60}Co$. Through the presence of reagents the halogen atoms, which have been exposed to the gamma rays, are then reduced to halides and with be homogeneously incorporated into the briquettes.

The process also foresees the possibility of adding in the reaction tanks additional additives 23, preferably manganese, zinc, nickel, copper or silicates, preferably silicates of these metals. The addition of such manganese and/or zinc and/or nickel and/or copper containing silicates is improving the burning properties of the briquettes and helps to reduce the amount of slag. The addition of these metals can also increase the efficiency of the lanthanide catalyst and is normally used in quantities of approximately 10 vol-% of the lanthanides used. Furthermore, it has been found that such metals, especially copper, enhances the removal of chlorine from chlorinated hydrocarbons through a partially catalytic process.

With the inventive process an improved fuel, respectively briquette, can be produced which contains lanthanides as well as silicates from manganese and/or zinc and/or nickel and/or copper.

The inventive process is used for the production of a fuel or briquette which preferably can be used in an incinerator, respectively gasification reactor, connected to a system producing energy. If products containing chlorine are present, it is advantageous if the incineration, respectively gasification reactor is equipped with a gas scrubber. Although, with a pH-neutral briquette such chlorides are normally destroyed or mineralized in the slag.

We claim:

1. A gasification apparatus comprising a combustion or gasification reactor having a combustion or gasification chamber, at least one opening for feeding the fuel, at least one infeed for gases and at least one outlet for gases, characterized in that the combustion or gasification reactor is a double dome reactor with the combustion or gasification chamber being formed by an outer dome and an inner dome, said inner dome having a central axis and rotatable about said axis, whereby at least one of said inner and outer domes is adjustable in the vertical level.

2. A gasification apparatus according to claim 1, characterized in that the double dome reactor is provided with at least one infeed to add directly and/or indirectly a gas mixture containing hydrogen and/or oxygen.

3. A gasification apparatus according to claim 1, characterized in that the double dome reactor is connected directly and/or indirectly with at least one catalyst station for the production of a gas mixture of hydrogen and oxygen.

4. A gasification apparatus according to claim 1, characterized in that the outlet of the exhaust gases of the double dome reactor is directly or indirectly connected to an energy producing engine driving a generator.

5. A gasification apparatus according to any one of claims 4, characterized in that said energy producing engine driving said generator has a gas outlet for the exhaust gases allowing the gases to be at least partially returned to the gasification reactor.

6. A gasification apparatus according to claim 1, characterized in that the domes of the double dome reactor are manufactured out of heat-resistant material.

* * * * *